Figure 1:
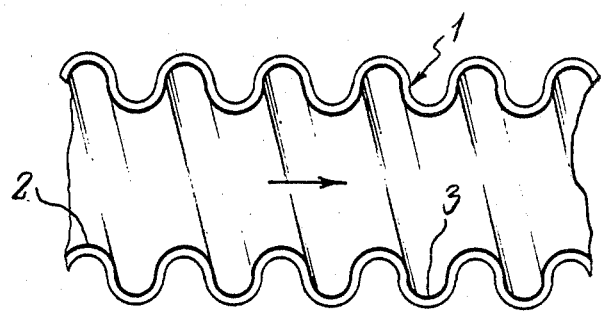

United States Patent [19]

Turner et al.

[11] 4,393,721
[45] Jul. 19, 1983

[54] APPARATUS FOR MEASURING FLUID FLOW

[75] Inventors: John T. Turner, Higher Disley; Harish C. Gulati, Denton; William B. Hall, Alderley Edge, all of England; Arnold Watson, Auckland, New Zealand

[73] Assignee: The Victoria University of Manchester, Manchester, England

[21] Appl. No.: 293,344

[22] Filed: Aug. 17, 1981

[30] Foreign Application Priority Data

Aug. 16, 1980 [GB] United Kingdom ............... 8026746

[51] Int. Cl.³ .............................................. G01F 1/20
[52] U.S. Cl. ................................................ 73/861.21
[58] Field of Search .......... 73/861.18, 861.21, 861.32, 73/861.34; 116/137 R, 137 A

[56] References Cited

U.S. PATENT DOCUMENTS 3,895,530  7/1975  Paetzold .......................... 73/861.34
3,943,884  3/1976  Majkrzak ..................... 73/861.21 X

FOREIGN PATENT DOCUMENTS 1545344  5/1979  United Kingdom .
1564844  4/1980  United Kingdom .

OTHER PUBLICATIONS

Crawford, "Singing Corrugated Pipes" in APJ vol. 42, 4/74, pp. 273-288.

Primary Examiner—Herbert Goldstein
Attorney, Agent, or Firm—Robert L. Stone

[57] ABSTRACT

Apparatus for measuring fluid flow comprising a tubular body (4) within which is supported an insert (5) having on its outer surface a helical formation of crests (6) and troughs (7). Between the body (4) and the insert (5) there is a fluid flow path (8). A transducer (20) detects fluctuations in fluid flow characteristics in the path (8), and a resultant signal is transmitted via amplifier (21), filter (22) and frequency counter (23) to a display (24) calibrated in terms of rate of fluid flow along the path (8).

16 Claims, 6 Drawing Figures

FIG.4
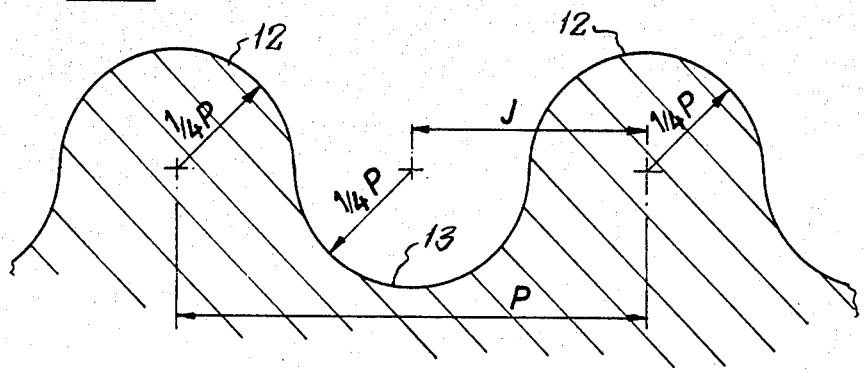
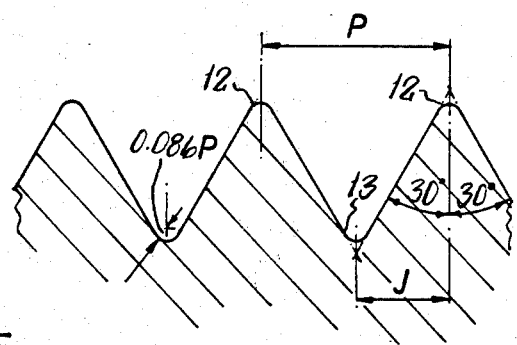
FIG.5
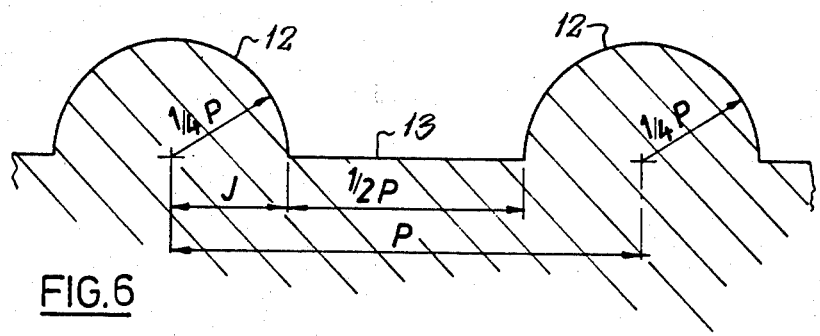
FIG.6

APPARATUS FOR MEASURING FLUID FLOW

This invention relates to apparatus for measuring fluid flow, and is based upon the appreciation that when fluid passes a physical obstruction, the resultant pressure and velocity fluctuation in the fluid can be detected.

It is to be understood that the term "fluid" as used herein is generic to liquids, gases and vapours.

According to the present invention there is provided apparatus for measuring fluid flow, comprising means defining a fluid flow path, crest and trough formations disposed along said path such that flow of a fluid over said formations produces a signal which is dependent upon the fluid flow, means for detecting said signal, and means for converting the detected signal to provide a measurement of the fluid flow.

The fluid flow to be measured may be taken to represent the velocity of the fluid or the flow rate thereof.

In the preferred embodiment of the invention, the apparatus comprises a tubular body within which the fluid flow path is defined, said crest and trough formations being disposed within said tubular body alternately along at least a portion of its length.

The crest and trough formations may be provided in a number of ways. For example, the wall of the tubular body may have internal corrugations which will preferably be defined by a groove extending helically along the inner surface of the body, but it is also envisaged that circumferential corrugations could be used. Since it may be difficult to machine the corrugations on the inner surface of the tubular body, it is preferable to use a thin-walled body the whole of which could be deformed lengthwise to provide the required internal corrugations.

In another example, the crest and trough fromations are provided on the outer surface of a solid or hollow elongate body for insertion into the tubular body such that an elongate annular flow path is defined between the inner wall of the tubular body and the outer surface of the insert. This insert preferably has a protuberance extending helically along the length of the body thus defining helical crests and troughs along the body. Such a helical crest and trough formation could, for example, be constituted by a precision screw thread machined on the insert. Preferably also, such an insert has its ends gradually tapered, e.g. at an angle of 10°-16°, so that fluid may flow smoothly around the insert with minimum disturbance, thereby ensuring a satisfactory signal, and the screw thread extends at least a short distance onto the tapered ends. The tapered ends may themselves be extended by short rods or the like around which suitable supports may be positioned to locate the insert in the tubular body, preferably concentrically within the tubular body.

It is preferred that the crests are maxima as opposed to having any degree of flatness. This is not to say however that the crests must be sharply pointed and it is in fact preferred that the upper portions of the crests have a curved profile in section perpendicular to the helical turns or to the circumference as the case may be. Also, it is preferred that the troughs have a similar profile, although it has been found that, in the troughs, a greater degree of flatness may be tolerated. In the case of both radiussed troughs and radiussed crests, the trough and crest radii may be the same or different. It is thought to be preferred that there is a smooth transition in the surface between the end of the radiussed section of a crest and the beginning of a radiussed section of a trough.

Assuming the crest formation to be helical with radiussed crests and troughs as described above, then if the crest height is measured from the level of the base of an adjacent trough, and the pitch is the distance between centres of consecutive crest peaks, it is preferred that the ratio of crest height to pitch is in the range of 0.2 to 0.6 and that the ratio of the radius of the crest or trough to the pitch is in the range of 0.1–0.4.

Whatever the shape of the crests and troughs, they may be of the same configuration along the length of the fluid flow path so that there is a regular crest to crest and trough to trough spacing. This regular spacing may assist in producing a regular periodic signal which is representative of the fluid flow being measured. Alternatively, the crests and troughs may be of differing configurations along the length of the fluid flow path thus contributing towards an extension of the range of fluid flow rate over which the device will operate.

It is also preferred that the surface finish of the crests and troughs is aerodynamically smooth in the same sense that this term is normally understood in aerodynamics and fluid mechanics. That is to say that the surface roughness should not extend beyond the edge of the laminar sub layer of a fluid flowing over the surface, the laminar sub layer being that region of the flow adjacent to the surface which is dominated by viscous action and is not influenced by turbulent fluctuation.

The passage of the fluid along its flow path creates a periodic pressure fluctuation and there will also be a periodic velocity fluctuation along the path, both caused by passage of the fluid over the crest and trough formations. Both the pressure and velocity fluctuations are representative of the fluid flow and constitute signals which can be detected for measuring the fluid flow.

Irrespective of whether pressure or velocity fluctuation is being measured, a signal detector is located preferably adjacent to the downstream end of the fluid flow path, since this location has been found to produce a clearer signal which is less influenced by background disturbances than is the case with an upstream location of the detector.

Means are provided for processing the detected signal to give the fluid flow rate or a representation thereof.

In some cases the generated signal is dependent upon certain parameters such as the viscosity and density of the fluid, and therefore converting equipment must take account of these differences if the apparatus is to be used for measuring the flow of different fluids.

The manner in which the signal is generated is not yet fully understood but is believed to be the result of a fluid mechanical coupling between pressure variations caused by passage of fluid over the crests and troughs, and characteristic frequencies of the system determined by the geometry of the fluid flow path and parameters of the fluid, e.g. flow rate and temperature, pressure, speed of sound, and viscosity. So far as pressure fluctuations are concerned it is thought that there are successive compressions and rarefactions in the fluid as it passes along the flow path over the troughs and crests, and that these variations constitute a weak passing frequency, determined by the rate at which fluid passes over the crests, which is amplified by the characteristics of the system to generate the signal which is detected. A very simple analogy is that of an organ pipe which resonates when a tuning fork is suitably placed near the mouth of the pipe.

The apparatus of the invention may be used for measuring flow rate of gases, liquids or vapours although it is to be understood that different constructions of fluid flow measuring apparatus falling within the scope of the invention may be required for different applications. The apparatus for different applications would differ, for example, in overall length, width of flow path, number of crest and trough formations, etc. The part or parts of the measuring apparatus which come into contact with the fluid may be of any suitable material, for example, steel, plastics etc. For certain applications, the choice of material will be dictated by the fluid whose flow is to be measured. For example, in apparatus for measuring the flow of molten metal, a ceramic material would be chosen.

It is envisaged that a principal use for the invention will be as a meter for measuring domestic or industrial gas supply.

Figure 2:
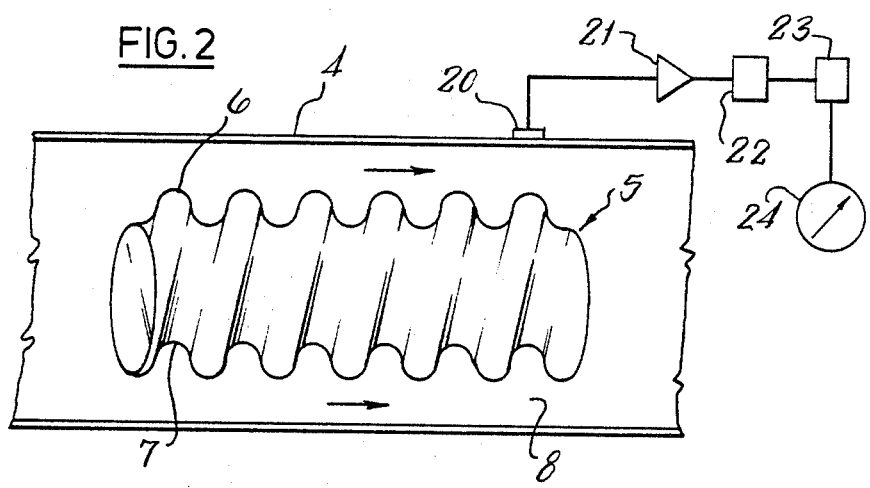
Figure 3:
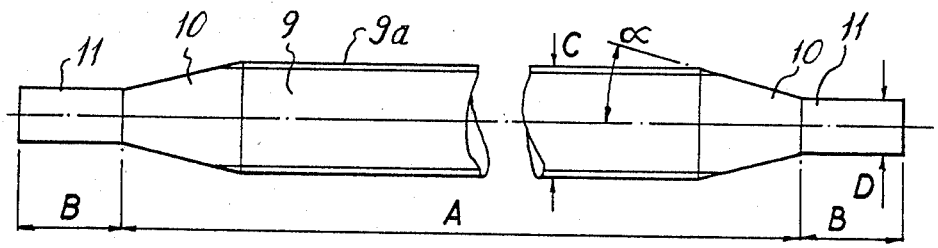

Several embodiments of the invention will be described, by way of example only, with reference to the accompanying drawings, in which:

FIGS. 1 and 2 diagrammatically show two types of flow path for use in a flow measuring apparatus, FIG. 3 is a diagrammatic view of an insert having crest and trough formations and for location in a tubular body for defining an annular fluid flow path; and, FIGS. 4 to 6 are expanded diagrammatic sectional views to illustrate typical crest and trough formations for the insert of FIG. 3, the sections being taken in a plane perpendicular to the helical turns or circumference of the crests and troughs.

Referring to the drawings, FIG. 1 shows a length of a tubular body generally indicated at 1 which is formed with a helically extending crest formation 2 and a helically extending trough formation 3 on its inner surface provided by suitable forming of the body 1. The body 1 may be provided as a section of a pipe carrying fluid and will be provided with a signal detector (to be described), preferably at its downstream end, for picking up the signal generated by fluid flow through the body 1.

In an alternative arrangement as illustrated in FIG. 2, there is provided a plain tubular body 4 within which is located an insert generally indicated at 5 with a helically extending crest formation 6 and a corresponding trough formation 7. The insert 5 which is a solid or closed hollow member defines an annular fluid flow path 8 within the body 4.

A signal detector or transducer 20 is mounted on the wall of the tubular body 4 adjacent to the downstream end of the flow path 8 around the member 5. The transducer is thus adapted to detect the pressure or velocity fluctuation experienced locally by the fluid in the form of, for example, an oscillating acoustic signal which is fed to an amplifier 21. The amplified signal is fed to a filter 22 which analyses the signal and rejects unwanted components before transmitting the signal to a frequency meter or counter 23 which measures the dominant frequency and gives a reading, calibrated in terms of flow rate, on a digital or analogue display device 24 which, if required, may include a facility for recording the rate and/or the volume of fluid passed.

FIG. 3 shows a preferred type of insert for use in the arrangement generally depicted in FIG. 2. The insert of FIG. 3 is a solid member having a generally cylindrical centre portion 9, a tapered section 10 at each end of the cylindrical portion 9, and terminal rod portions 11 at the outer ends of the tapered sections 10.

The cylindrical portion 9 has helical crest and trough formations 9a, e.g. precision screw threads, along its length and these formations extend at each end onto one of the tapered sections 10 which themselves slope away from the cylindrical portion 9 at an angle $\alpha°$. The terminal rod portions 11 are used in conjunction with suitable supports to locate the insert concentrically within the tube 4, as depicted in FIG. 2. The overall length of the portion 9 and sections 10 is given as A, and the length of each rod 11, as 8. The maximum diameter of the portion 9 is given to C, and that of the rod portions 11 as D.

FIGS. 4 to 6 show typical examples of helical crest formations 12 and trough formations 13, the helical formations having a pitch P millimeters and there being a distance J millimeters between the vertical centre line of a crest 12 as viewed in the drawings, and the root of the next adjacent trough 13.

FIG. 4 shows a formation in which the crests 12 and troughs 13 are both equally radiussed with the radius being a quarter of the pitch. Exemplary parameters for an insert of the type shown in FIG. 3 incorporating the formation of FIG. 4 are shown in Table 1, where dimensions of A, B, C and D are given in millimeters.

TABLE 1

| P | A | B | C | D | J | α° |
|---|---|---|---|---|---|---|
| 4.23 | 40 | 150 | 15.22 | 10 | ¼P | 14 |
| 4.23 | 40 | 250 | 15.22 | 10 | ¼P | 14 |
| 6.35 | 40 | 250 | 15.22 | 10 | ¼P | 14 |
| 3.18 | 40 | 250 | 15.22 | 10 | ¼P | 14 |

The crests 12 and troughs 13 of the formation shown in FIG. 5 are generally triangular in section with apices of 60° and with the tops of the crests and roots both having a radius of 0.086 P. Table 2 shows exemplary parameters for an insert of the type shown in FIG. 3 incorporating the formation of FIG. 5.

TABLE 2

| P | A | B | C | D | J | α° |
|---|---|---|---|---|---|---|
| 4.23 | 40 | 250 | 15.22 | 10 | ¼P | 14 |

The formation of FIG. 6 has radiussed crests 12 with the radius being a quarter of the pitch, and troughs 13 with a flat root width equal to one half of the pitch. Table 3 shows exemplary parameters for an insert of the type shown in FIG. 3 incorporating the formation of FIG. 6.

TABLE 3

| P | A | B | C | D | J | α° |
|---|---|---|---|---|---|---|
| 4.23 | 40 | 150 | 15.22 | 10 | ¼P | 14 |
| 4.23 | 40 | 250 | 15.22 | 10 | ¼P | 14 |
| 4.23 | 40 | 380 | 15.22 | 10 | ¼P | 14 |

What is claimed is:

1. Apparatus for measuring fluid flow comprising a tubular body, means defining a fluid flow path, a member within said tubular body formed of crest and trough formations disposed along said path such that the flow of fluid is between the outer surface of said member and the internal surface of said tubular body and produces a signal which is dependent upon the fluid flow, means for detecting said signal, and means for converting the detected signal to provide a measurement of the fluid flow.

2. Apparatus according to claim 1, including a tubular body within which the fluid flow path is defined, said crest and trough formations being arranged on said internal member within said tubular body alternately along at least a portion of the length of said internal member.

3. Apparatus according to claim 1, wherein the wall of said internal member is deformed lengthwise to provide corrugations forming said crest and trough formations internally thereof.

4. Apparatus according to claim 1, wherein said crest and trough formations are provided by a protuberance extending helically along the length of said fluid flow path.

5. Apparatus according to claim 1, wherein the end regions of said internal member are tapered towards the outer ends thereof whereby fluid may flow smoothly around said member with minimum disturbance.

6. Apparatus according to claim 1, wherein said crests have a curved profile in section.

7. Apparatus according to claim 1, wherein said troughs have a curved profile in section.

8. Apparatus according to claim 1, wherein said crests and said troughs have a curved profile in section, there being a smooth transition in the surface between the end of the curvature of each crest and the beginning of the curvature of each adjacent trough.

9. Apparatus according to claim 1, wherein the ratio of crest height to crest pitch is in the region of 0.2 to 0.6.

10. Apparatus according to claim 1, wherein the ratio of the radius of curvature of each crest, in section, to the crest pitch is in the region of 0.1 to 0.4.

11. Apparatus according to claim 9, wherein the height of each crest above the root of the adjacent trough is equal to one half of the pitch between crests.

12. Apparatus according to claim 9, wherein the height of each crest above the root of the adjacent trough is equal to one quarter of the pitch between crests.

13. Apparatus according to claim 1, wherein said crests and troughs are of varying configuration along the length of said fluid flow path.

14. Apparatus according to claim 1, wherein said means for detecting said signal is located in the region of the downstream end of said fluid flow path.

15. Apparatus according to claim 1, wherein said means for detecting said signal comprises a transducer disposed with respect to said fluid flow path to detect fluctuations in fluid flow characteristics therein and to produce a signal representative thereof, and said means for converting said detected signal comprises an amplifier, a filter for removing the unwanted components of the representative signal, a frequency measuring or counting device and a display device.

16. Apparatus according to claim 15, wherein said display device is calibrated in terms of the rate of fluid flow.

* * * * *